United States Patent
Wu

(10) Patent No.: US 10,148,153 B2
(45) Date of Patent: Dec. 4, 2018

(54) LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 388 days.

(21) Appl. No.: 14/870,163

(22) Filed: Sep. 30, 2015

(65) Prior Publication Data

US 2017/0047816 A1   Feb. 16, 2017

(30) Foreign Application Priority Data

Aug. 14, 2015 (TW) .............................. 104213138 U

(51) Int. Cl.
| | |
|---|---|
| *H02K 7/116* | (2006.01) |
| *H02K 11/00* | (2016.01) |
| *H02K 5/04* | (2006.01) |
| *H02K 11/30* | (2016.01) |
| *F16H 25/20* | (2006.01) |
| *F16H 57/039* | (2012.01) |

(52) U.S. Cl.
CPC .......... *H02K 7/1166* (2013.01); *F16H 25/20* (2013.01); *F16H 57/039* (2013.01); *H02K 5/04* (2013.01); *H02K 11/30* (2016.01); *F16H 2025/209* (2013.01); *F16H 2025/2034* (2013.01)

(58) Field of Classification Search
CPC ... F16H 25/20–25/2025; H02K 7/1166; H02K 7/06
USPC ......................... 74/89.38; 310/20, 37, 80, 71
See application file for complete search history.

(56) References Cited

U.S. PATENT DOCUMENTS

| | | | |
|---|---|---|---|
| 2007/0169578 A1* | 7/2007 | Christensen | F16H 25/2021 74/89.37 |
| 2008/0093942 A1* | 4/2008 | Huang | H02K 5/225 310/80 |
| 2010/0139428 A1* | 6/2010 | Roither | A47C 20/041 74/89.33 |
| 2012/0227522 A1* | 9/2012 | Wu | F16H 25/20 74/89.14 |

* cited by examiner

*Primary Examiner* — Thomas Truong
(74) *Attorney, Agent, or Firm* — Chun-Ming Shih; HDLS IPR Services

(57) ABSTRACT

A linear actuator includes a housing, a transmission assembly, a slider, and a motor. The housing includes a base case and a cover case which are opposite combined with each other. A screw bracket is formed on an outer surface of the base case. The transmission assembly includes a worm and a worm wheel disposed at an end of the worm. The slider is disposed on the housing and engaged with the worm. The motor is screwed to the screw bracket and disposed out of the base case. The motor has an actuating shaft penetrating into the base case and engaged with the worm wheel. The motor can be fixed to the screw bracket in advance, which facilitates the assembly of the transmission assembly to the base case.

6 Claims, 9 Drawing Sheets

LINEAR ACTUATOR

BACKGROUND OF THE INVENTION

Field of the Invention

The present invention relates to a linear actuator, in particular, to a linear actuator which is convenient for assembly.

Description of Related Art

The existing linear actuator generally comprises a worm, a worm wheel, and a motor, which are disposed in a housing, and a slider disposed moveably on the housing. The worm and the worm wheel are linked to rotate simultaneously. The worm wheel is engaged with the motor and driven by the motor. The worm is engaged with the slider such that the slider is driven by rotating the worm to move on the housing.

In an ordinary design, the housing is separated into two opposite parts, an upper cover and a lower cover, which can be combined together. The components such as the worm, the worm wheel, and the motor are placed into the lower cover, one by one. Then, the preliminary positioning is done by the ribs disposed on the inner wall of the lower cover. Next, the upper cover is restored. As such, the upper cover and the lower cover hold the components such as the worm, the worm wheel, and the motor. The disadvantage of the above method is that the components such as the worm, the worm wheel, and the motor are placed into the lower cover in an unfixed condition, which is inconvenient for assembly and liable to lead to assembly tolerances.

In view of this, the inventor pays special attention to research with the application of related theory and tries to improve and overcome the above disadvantages regarding the above related art. Finally, the inventor proposes the invention which is a reasonable design and overcomes the above disadvantages.

SUMMARY OF THE INVENTION

It is an objective of the present invention to provide a linear actuator which is convenient for assembly.

The linear actuator of the present invention comprises a housing, a transmission assembly, a slider, and a motor. The housing comprises a base case and a cover case, opposite combined with each other. A screw bracket is formed on an outer surface of the base case. The transmission assembly comprises a worm and a worm wheel disposed at an end of the worm. The slider is disposed on the housing and engaged with the worm. The motor is screwed to the screw bracket and is disposed out of the base case. The motor has an actuating shaft penetrating into the base case and engaged with the worm wheel.

Preferably, a pair of guide grooves is formed on the slider; the edges of the base case can be slidingly embedded into the pair of guide grooves. A cover plate is formed on the cover case. The slider surrounds the base case and the cover plate.

Preferably, a control module is disposed in the housing and is electrically connected to the motor. The control module has a connector penetrating out of the housing. A first edge is formed at the base case and a second edge is formed at the cover case. The first edge and the second edge are opposite combined to form a side opening through which the connector penetrates out of the housing. The control module has a PCB (Printed Circuit Board) disposed along a side of the worm. The connector is disposed on the PBC. A plurality of limit switches is disposed corresponding to two ends of the worm and the limit switches are disposed on the PCB. The base case protrudes to form a pivot connector. A pivot shaft is formed on the slider. The pivot axes of the pivot connector and the pivot shaft are parallel to each other. A protruding direction of the connector is parallel to the pivot axes of the pivot connector and the pivot shaft. At least one reinforcement structure is formed on an inner wall of the base case corresponding to the pivot connector.

The linear actuator of the present invention is provided a motor attached out of the housing. During the assembly, the motor can be fixed to the base case in advance, which facilitates the assembly of the transmission assembly to the base case.

DETAILED DESCRIPTION OF THE INVENTION

Figure 1:
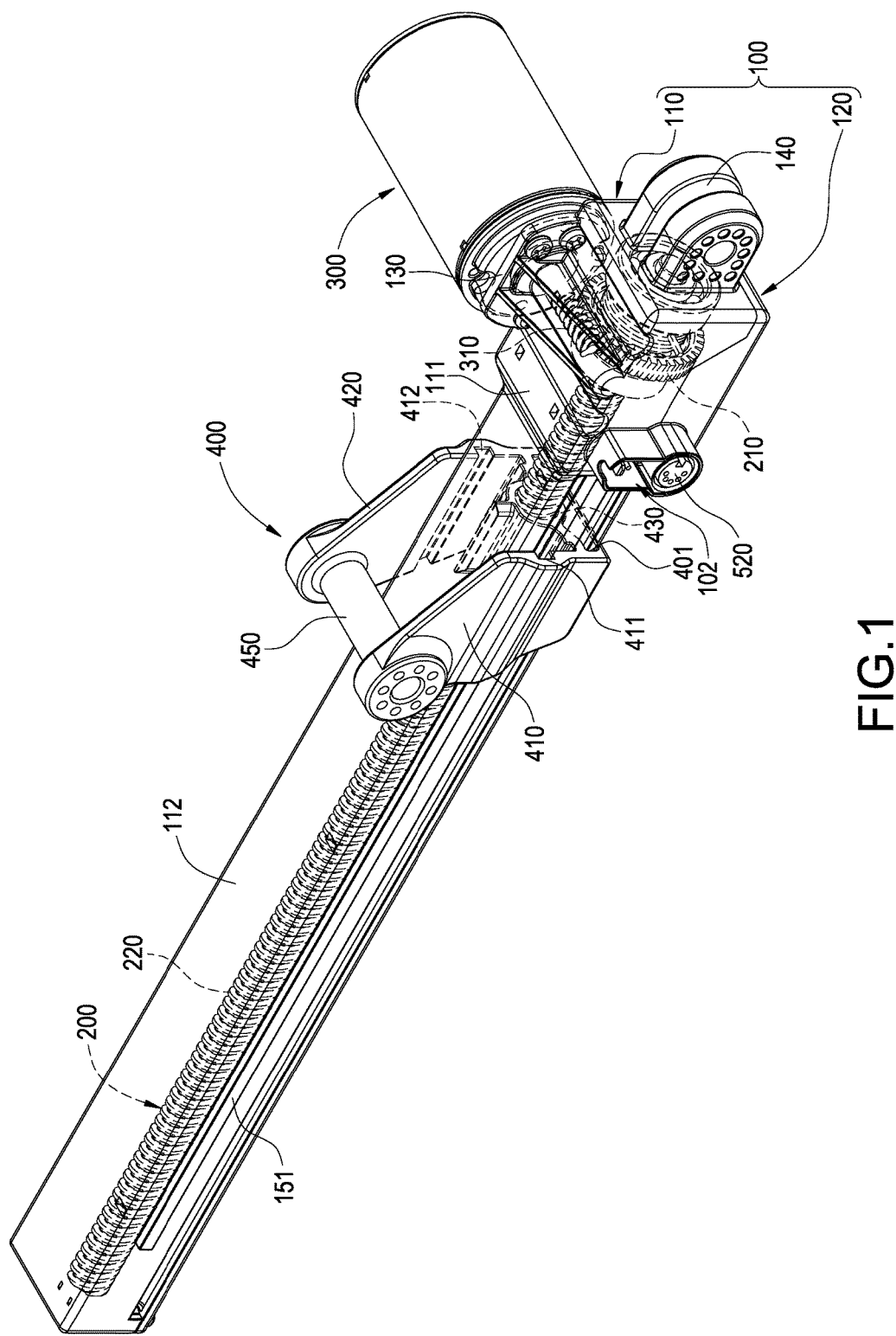
FIG. 1 is a perspective schematic view of the linear actuator according to a preferred embodiment of the present invention.
Figure 2:
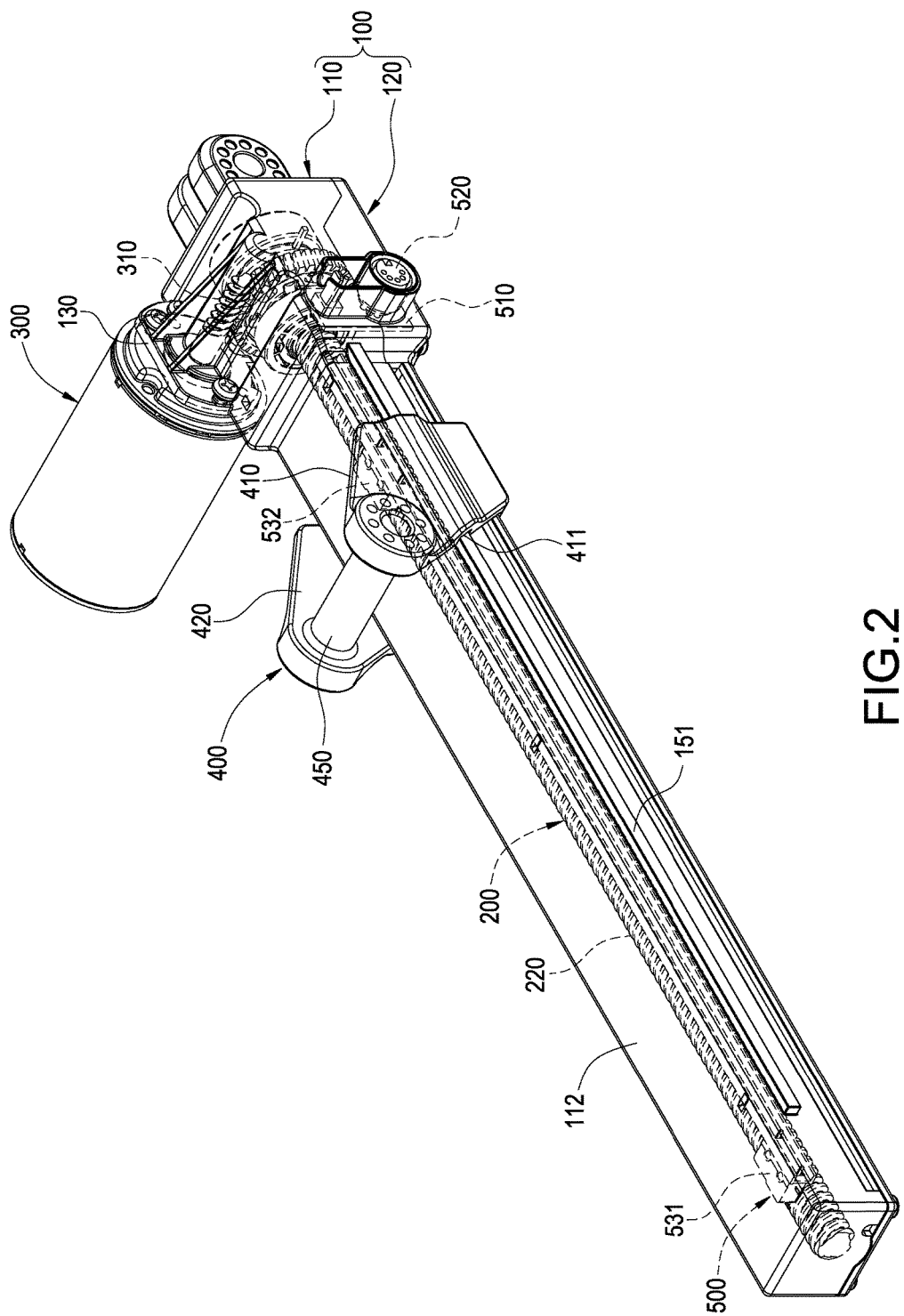
FIG. 2 is another perspective schematic view of the linear actuator according to a preferred embodiment of the present invention.

Referring to FIGS. 1 and 2, the preferred embodiment of the present invention provides a linear actuator which comprises a housing 100, a transmission assembly 200, a motor 300, a slider 400, and a control module 500.

Figure 3:
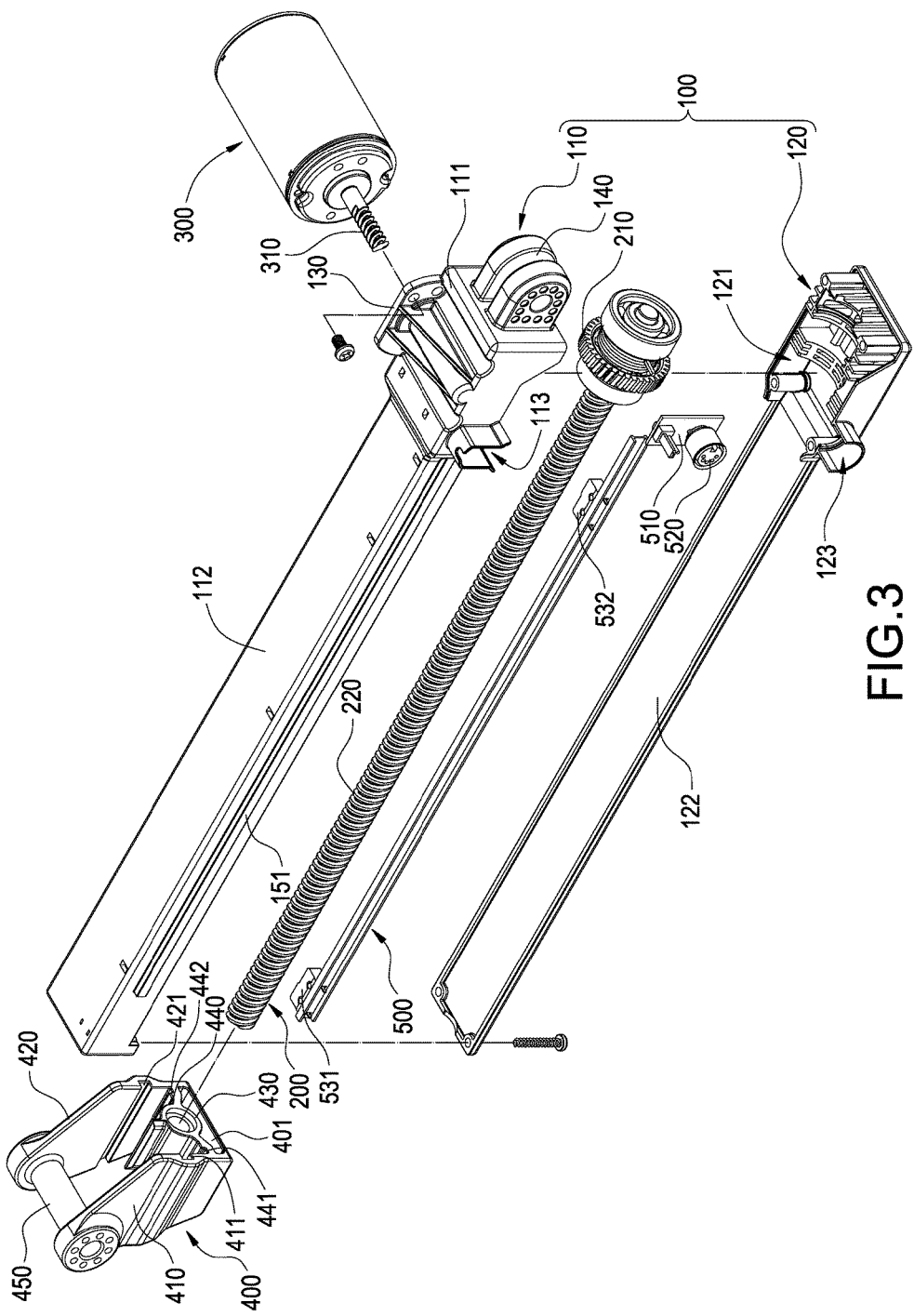
FIG. 3 is a perspective exploded view of the linear actuator according to a preferred embodiment of the present invention.
Figure 4:
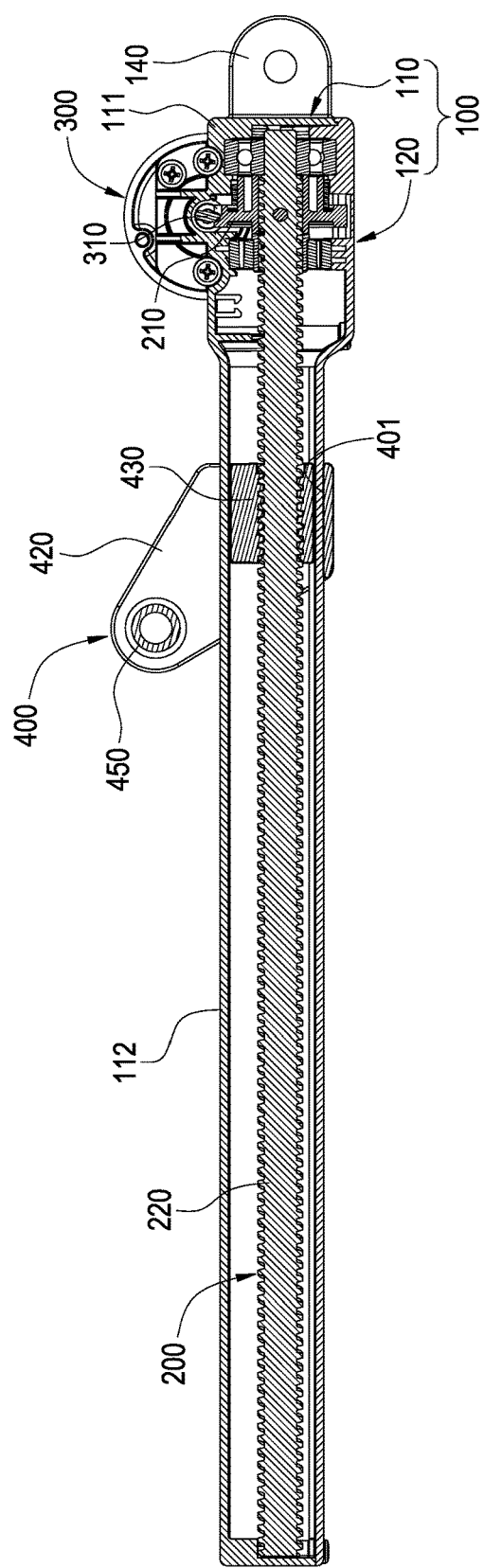
FIG. 4 is a vertical cross-sectional view of the linear actuator according to a preferred embodiment of the present invention.
Figure 5:
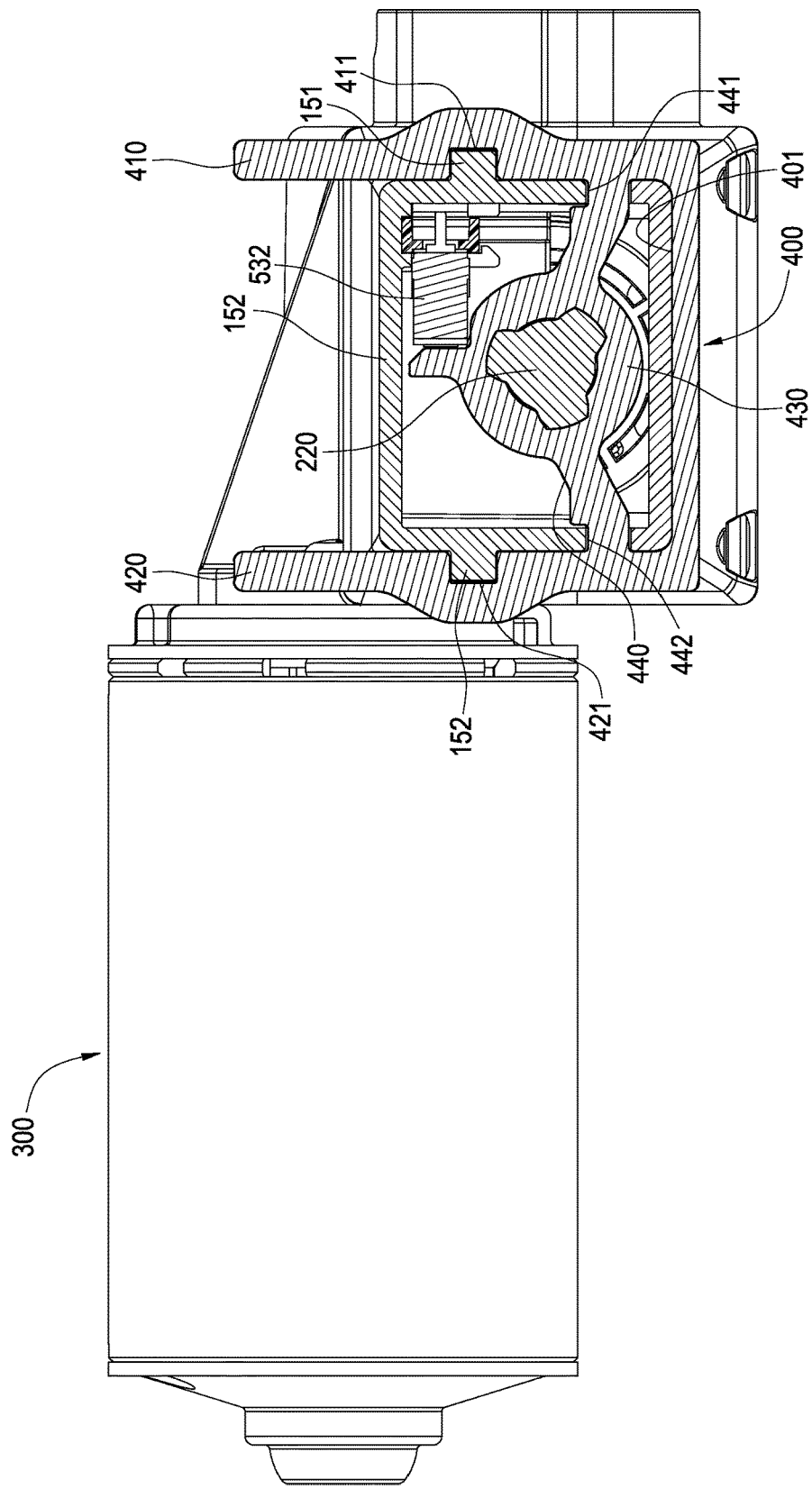
FIG. 5 is a transverse cross-sectional view of the slider of the linear actuator according to a preferred embodiment of the present invention.
Figure 6:
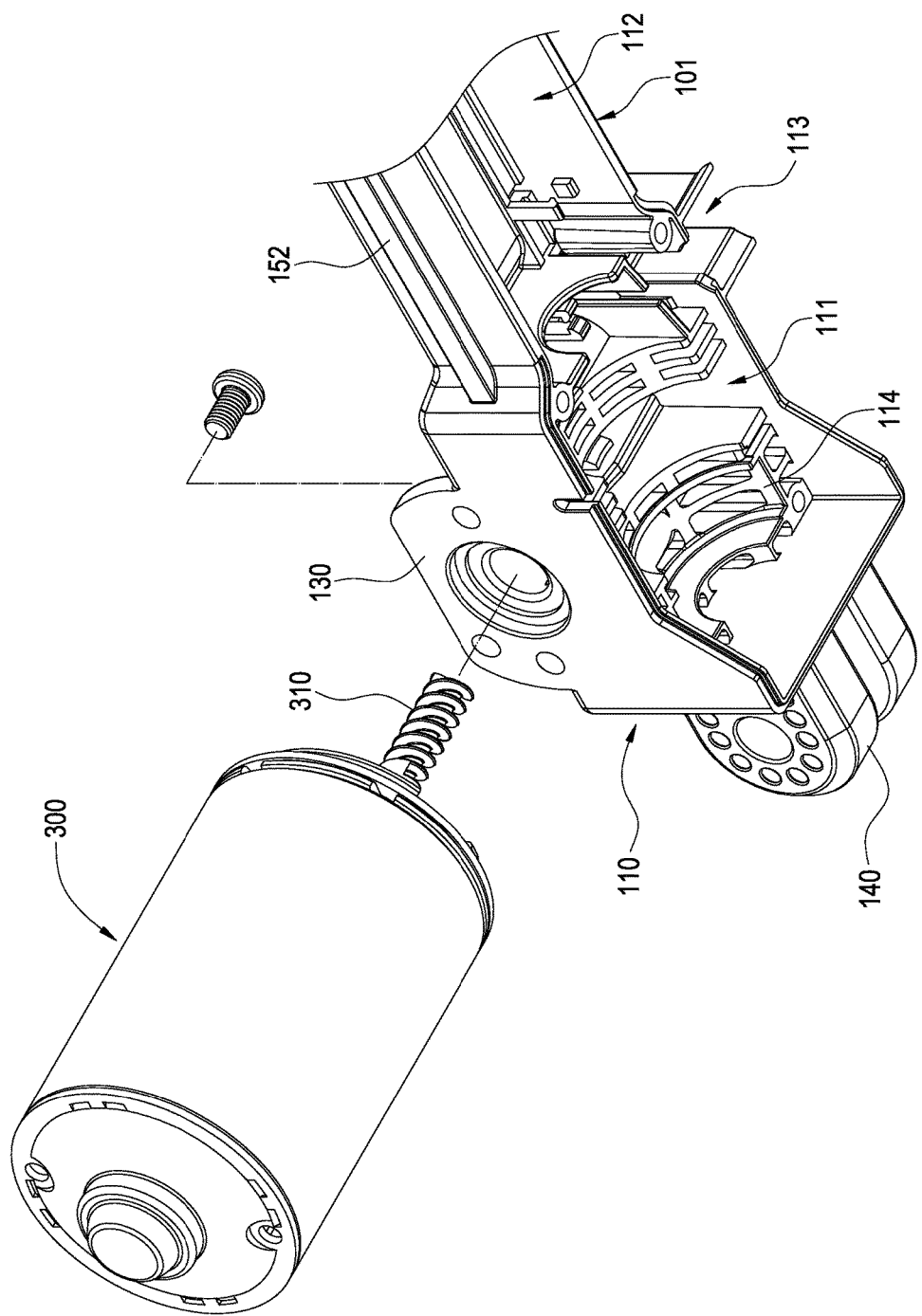
FIG. 6 is a schematic view of the installation of the motor of the linear actuator according to a preferred embodiment of the present invention.
Figure 7:
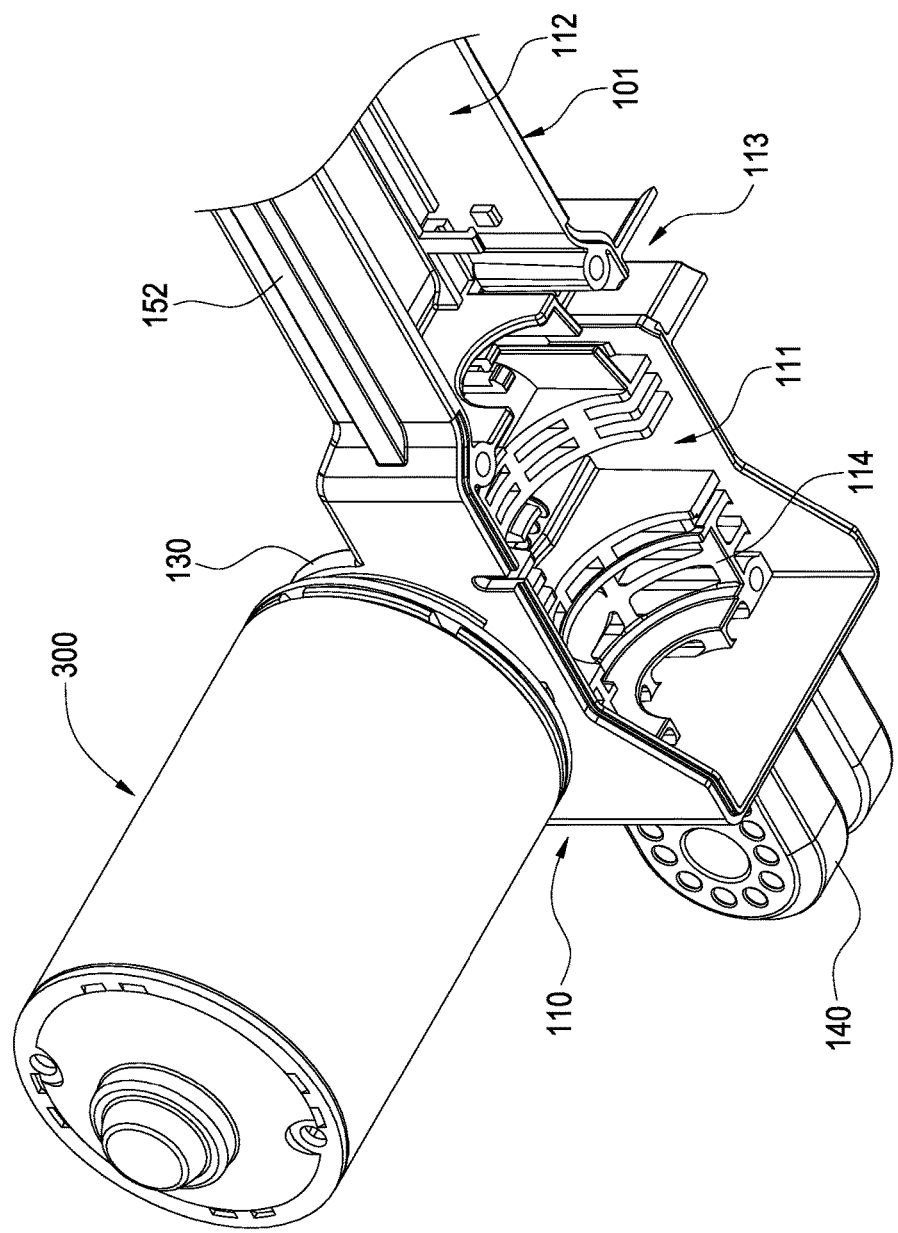
FIG. 7 is another schematic view of the installation of the motor of the linear actuator according to a preferred embodiment of the present invention.

Please refer to FIGS. 3-5. The housing 100 has a hollow cylinder shape. The housing 100 can be separated, along its longitudinal axis, into a base case 110 and a cover case 120 which is opposite combined with the base case 110. A control room 111 and a transmission room 112 having a long shape are formed in the base case 110 and communicate with each other. A screw bracket 130 is formed on an outer surface of the base case 110. The base case 110 has an opening 101. A first edge 113 is formed at the edge of the opening 101 of the control room 111. The cover case 120 forms a control room cover 121 which extends to form a cover plate 122 having a long shape. A second edge 123 is formed at the edge of the control room cover 121. The cover case 120 can cover the opening 101 of the base case 110 and combine with the base case 110 correspondingly. When the base case 110 combines with the cover case 120, the control room cover 121 will cover the control room 111, the cover plate 122 will cover the transmission room 112, and the first edge 113 and the second edge 123 will be opposite combined to form a side opening 102. On the outer surface of the control room 111, the base case 110 protrudes to form a pivot connector 140; at least one reinforcement structure 114 is formed on an inner wall of the base case 110 corresponding to the pivot connector 140. When the linear actuator operates, the reinforcement structure 114 can distribute the reaction force from the pivot connector 140 to reduce the risk of deformation of the base case 110 caused by the force. In the current embodiment, the reinforcement structure 114 is constructed with a plurality of ribs. A pair of rails 151/152 is longitudinally extended along the transmission room 112 of the base case 110 and individually protruded on outer surfaces of two sides of the transmission room 112. The pair of rails 151/152 is disposed parallel to each other.

The transmission assembly 200 comprises a worm wheel 210 and a worm 220. The worm wheel 210 is disposed at an end of the worm 220 and can rotate axially in connection with the worm 220. The worm 220 is received in the transmission room 112 of the base case 110; the worm wheel 210 is received in the control room 111 of the base case 110.

Please refer to FIGS. 1, 2, 6, and 7. The motor 300 is screwed to the screw bracket 130 and disposed out of the base case 110. The motor 300 has an actuating shaft 310 penetrating into the base case 110 and engaged with the worm wheel 210.

Please refer to FIGS. 3-5. The slider 400 has a pair of sidewalls 410/420, spaced to each other. The sidewalls 410/420 individually form sliding grooves 411/421 which are parallel to each other. A sleeve 430 is disposed between the sidewalls 410/420. The axial direction of the sleeve 430 is parallel to those of the sliding grooves 411/421. The sleeve 430 is provided with internal threads and is connected to the pair of sidewalls 410/420 through a connecting structure 440. The connecting structure 440 forms a throughhole 401 has an axial direction which is parallel to those of the sleeve 430 and the sliding grooves 411/421. A pair of guide grooves 441/442 are individually disposed between the connecting structure 440 and the sidewalls 410/420. The guide grooves 441/442 are disposed parallel to the sliding grooves 411/421. A pivot shaft 450 is formed on the slider 400 and is disposed between the pair of sidewalls 410/420. Two ends of the pivot shaft 450 are individually connected to the pair of sidewalls 410/420.

The slider 400 is disposed on the housing 100. Two side edges of transmission room 112 of the base case 110 can be slidingly embedded into the pair of guide grooves 441/442 to support the slider 400, which is not like the prior art requiring excessive rib to be disposed on the slider 400. The worm 220 passes through the sleeve 430 and is engaged with the sleeve 430 through the internal threads of the sleeve 430. The pivot shaft 450 of the slider 400, the pair of sidewalls 410/420, and the connecting structure 440 surround the base case 110. The rails 151/152 on the base case 110 are individually embedded into the sliding grooves 411/412 of the slider 400. The cover case 120 passes through the throughhole 401 and is surrounded and covered by the slider 400. The pivot axes of the pivot connector 140 and the pivot shaft 450 are parallel to each other.

The motor 300 is screwed to the screw bracket 130 and disposed out of the base case 110. The actuating shaft 310 of the motor 300 penetrates into the base case 110 and is engaged with the worm wheel 210. Therefore, during the assembly of the linear actuator of the present invention, the motor 300 can be fixed to the base case 110 in advance and the transmission assembly 200 is then placed into the base case 110, which overcomes the disadvantage of all the components assembled in an unfixed condition with the existing technology.

Please refer to FIGS. 1-3. The control module 500 is disposed in the housing 100 and is used to control the operation of the motor 300. The control module 500 comprises a PCB 510 electrically connected to the motor 300, a connector 520, and a plurality of limit switches 531/532. The connector 520 is disposed on the PCB 510 and penetrates out of the housing 100 through the side opening 102. The protruding direction of the connector 520 is parallel to the pivot axes of the pivot connector 140 and the pivot shaft 450.

In the current embodiment, the limit switches 531/532 are disposed correspondingly at two ends of the worm 220 in the transmission room 112. Thus, the control module 500 can limit the moving range of the slider 400. Each of the limit switches 531/532 is electrically connected to the PCB 510 via conducting wires, but not limited to this in the present invention. For example, the PCB 510 can be also disposed along a side of the worm 220, as shown in FIG. 8, and the limit switches 531/532 can be disposed on the PBC 510 corresponding to two ends of the worm 220 for convenient assembly.

Figure 8:
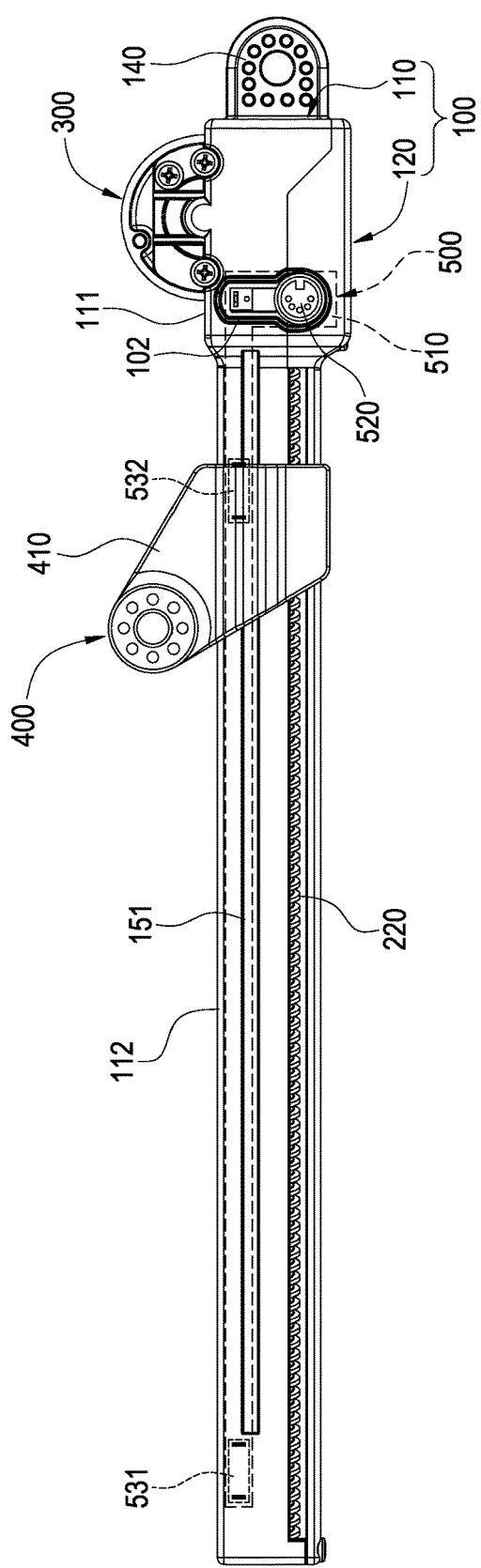
FIG. 8 is a side view of the linear actuator according to a preferred embodiment of the present invention.
Figure 9:
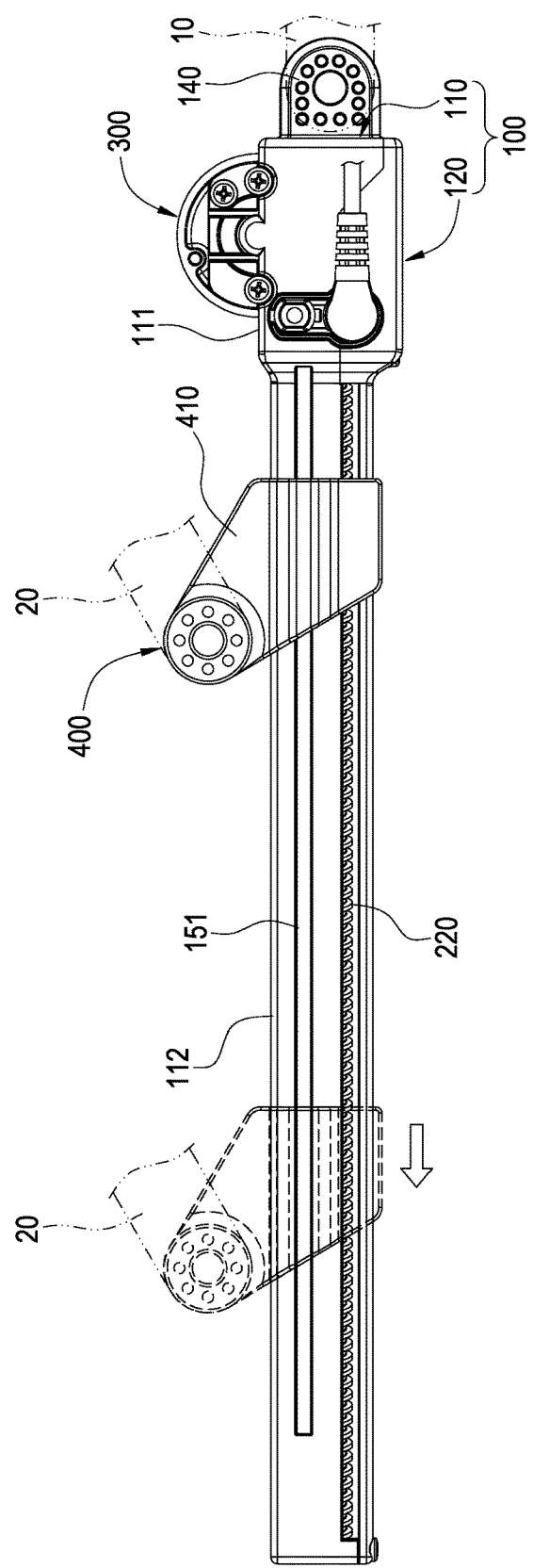
FIG. 9 is a schematic view of the linear actuator according to a preferred embodiment of the present invention in operation.

Please refer to FIGS. 8 and 9. While the linear actuator of the present invention is in operation, the pivot connector 140 is pivoted to a fixing part 10 and the pivot shaft 450 is pivoted to a moving part 20. When the motor 300 operates, it can drive the worm 220 to rotate axially through the worm wheel 210 and further drive the slider 400 to move along the axis of the worm 220. Because the protruding direction (i.e., the plugging direction) of the connector 520 is parallel to the pivot axes of the pivot connector 140 and the pivot shaft 450, the actuation ranges of the connector 520 and the pivot shaft axis are individually located at different sides of the housing 100. Thus, the wiring space associated with the connector 520 can be more flexible and will not interfere with the actuation range of the pivot shaft 450.

Furthermore, the slider 400 surrounds the cover plate 122. In this way, when the motor 300 operates, the cover plate 122 can be fixed by the slider 400 and the noise caused by the resonance between the cover plate 122 and the motor 300 will not occur.

The embodiments described above are only preferred ones of the present invention and not to limit the claimed scope of the present invention. Therefore, all the equivalent modifications and variations applying the specification and figures of the present invention should be embraced by the claimed scope of the present invention.

What is claimed is:
1. A linear actuator, comprising:
a housing (100) comprising a base case (110) and a cover case (120), opposite combined with each other, wherein a screw bracket (130) is formed on an outer surface of the base case (110);
a transmission assembly (200) comprising a worm (220) and a worm wheel (210) disposed at an end of the worm (220);
a slider (400) disposed on the housing (100) and engaged with the worm (220); and
a motor (300) screwed to the screw bracket (130) and disposed out of the base case (110), wherein the motor (300) has an actuating shaft (310) penetrating into the base case (110) and engaged with the worm wheel (210),
wherein a control module (500) is disposed in the housing (100) and electrically connected to the motor (300), wherein the control module (500) has a connector (520) penetrating out of the housing (100), and wherein the base case (110) protrudes to form a pivot connector (140), wherein a pivot shaft (450) is formed on the slider (400), wherein pivot axes of the pivot connector (140) and the pivot shaft (450) are parallel to each other.

2. The linear actuator according to claim 1, wherein a first edge (113) is formed at the base case (110) and a second edge (123) is formed at the cover case (120), wherein the first edge (113) and the second edge (123) are opposite combined to form a side opening (102) through which the connector (520) penetrates out of the housing (100).

3. The linear actuator according to claim 1, wherein the control module (500) has a PCB (510) disposed along a side of the worm (220), wherein the connector (520) is disposed on the PCB (510) which is electrically connected to a plurality of limit switches (531/532) disposed correspondingly at two ends of the worm (220).

4. The linear actuator according to claim 3, wherein the limit switches (531/532) are disposed on the PCB (510).

5. The linear actuator according to claim 1, wherein a protruding direction of the connector (520) is parallel to the pivot axes of the pivot connector (140) and the pivot shaft (450).

6. The linear actuator according to claim 1, wherein at least one reinforcement structure (114) is formed on an inner wall of the base case (110) corresponding to the pivot connector (140).

* * * * *